United States Patent [19]

Kupcikevicius

[11] Patent Number: 4,641,687
[45] Date of Patent: Feb. 10, 1987

[54] CASING ARTICLE
[75] Inventor: Vytautas Kupcikevicius, Chicago, Ill.
[73] Assignee: Viskase Corporation, Chicago, Ill.
[21] Appl. No.: 642,242
[22] Filed: Aug. 20, 1984

Related U.S. Application Data

[63] Continuation-in-part of Ser. No. 429,395, Sep. 30, 1982, Pat. No. 4,466,463.

[51] Int. Cl.⁴ .................. F16L 11/00; A22C 11/02
[52] U.S. Cl. .................. 138/118.1; 138/109; 138/110; 426/105; 17/1 R; 17/41
[58] Field of Search ............ 138/118.1, 110, 103, 138/178, 109; 426/105, 135, 138, 36; 17/1 R, 32, 33, 35, 42, 41, 49; 206/802

[56] References Cited

U.S. PATENT DOCUMENTS

| 2,654,121 | 10/1953 | Nelson | 17/32 |
| 3,528,825 | 9/1970 | Doughty | 99/176 |
| 4,007,761 | 2/1977 | Beckman | 138/103 |
| 4,295,563 | 10/1981 | Becker et al. | 206/802 X |
| 4,321,728 | 3/1982 | Marz | 138/118.1 X |
| 4,430,772 | 2/1984 | Michel et al. | 138/118.1 |
| 4,466,465 | 8/1984 | Frey | 138/118.1 |
| 4,466,466 | 8/1984 | Randys | 138/118.1 |

FOREIGN PATENT DOCUMENTS 197809 9/1978 United Kingdom ............ 206/802

Primary Examiner—James E. Bryant, III
Attorney, Agent, or Firm—Roger Aceto

[57] ABSTRACT

A shirred casing article includes a tubular member which supports shirred casing at one end and a plurality of flattening disks at the other. The casing contains volatile agent which is detrimental to the disks if exposed to the disks over time. A barrier, such as a bag or wrap, impervious to the agent is closed over and about either the disks or the shirred casing to isolate the casing and the flattening disks one from the other.

17 Claims, 8 Drawing Figures

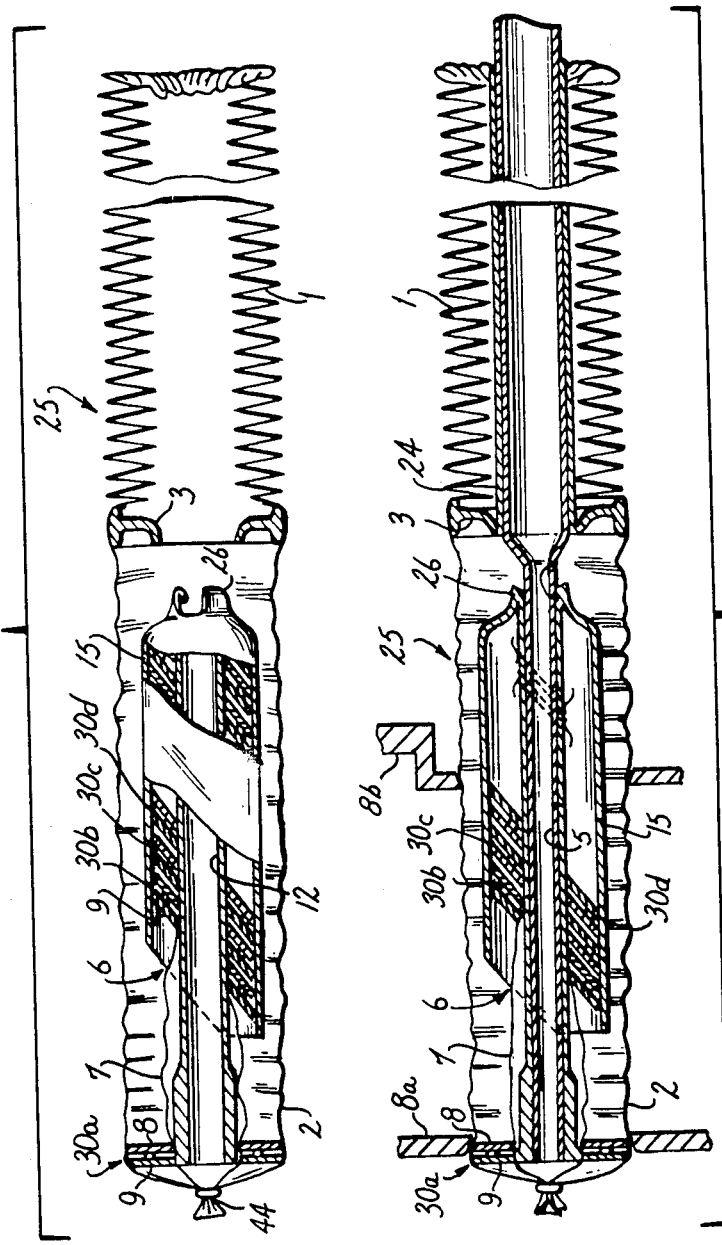

FIG. 3
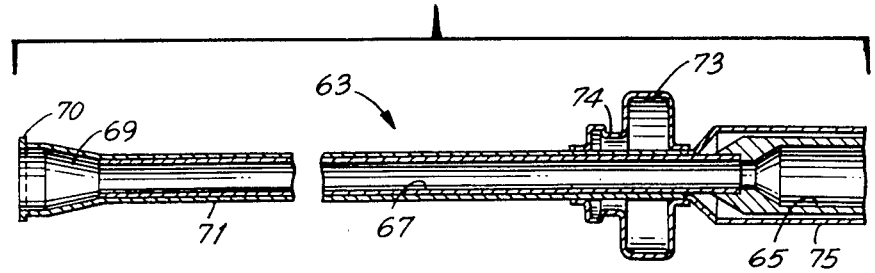
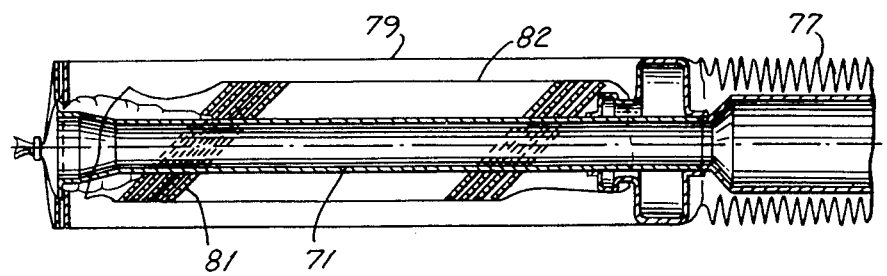
FIG. 4
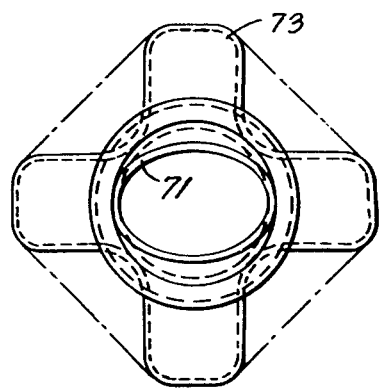
FIG. 5

CASING ARTICLE

RELATED APPLICATIONS

This application is a continuation-in-part of application Ser. No. 429,395 filed Sept. 30, 1982 now U.S. Pat. No. 4,466,463.

FIELD OF THE INVENTION

This invention relates generally to the production of large sausage products, and, more specifically, to a package article useful in continuously producing such products with flat ends.

BACKGROUND OF THE INVENTION

Large sausage casings are generally manufactured from materials such as regenerated cellulose, or regenerated cellulose having fibrous webs embedded therein, and are employed in the manufacture of large sausage products such as salami and bologna sausages, spiced meat loafs, cooked and smoked ham butts and the like. Such large sausage casings are produced in flat widths ranging in size from about 2 to 15 inches and range in length from about 14 to 72 inches and longer. The large sausage casings most commonly used for commercial production of large sausage products range in size from about 3 to 8 inches in flat width and from about 18 to 72 inches in length.

In recent years, systems for automatically stuffing meats and food emulsions into casings in a continuous fashion have become well-known in the art. Such systems are disclosed, for example, in U.S. Pat. No. Re. 30,390 and U.S. Pat. Nos. 4,077,090 and 4,164,057. Such systems commonly employ shirred tubular cellulosic food casings as disclosed, for example, in U.S. Pat. Nos. 2,983,949 and 2,984,574 to Matecki.

In the production of a large sausage product, a large sausage casing is first gathered over the end of a stuffing horn and then stuffed with a food emulsion. The thusly stuffed and encased food emulsion is subsequently cooked or cured according to conventional processes. Many of these large sausage products are thereafter sliced and packaged into units of predetermined weight and slice count for retail sale. The slicing devices employed in such packaging operations are pre-set to yield a specific weight-by-slice count for use in obtaining unit packages of equal weight. Since a large sausage casing stuffed with a food emulsion has two generally hemispherical or rounded ends, these rounded ends are generally not used in producing equal weight packages and are reworked (i.e., recycled in the production of a subsequent batch of food emulsion).

In order to minimize the rework resulting from these rounded ends, many prior attempts have been made to flatten them by utilizing a variety of methods and apparatus. While such attempts have attained some degree of success, none has proved to be entirely satisfactory. For example, U.S. Pat. No. 3,808,638 discloses a method for producing large sausage products having one pre-flattened end. Although this method reduces the sausage end rework by one-half, substantial rework is still present in the non-flattened end. As a further example, U.S. Pat. No. 3,777,331 discloses a method and apparatus for producing encased sausage with two flat ends whereby the end pieces are inserted in a non-fully automatic fashion. Such method and apparatus is limited to the use of continuous lengths of non-shirred casing, and does not lend itself to efficient commercial operation.

In the present invention a casing package article is provided that is useful in continuously and automatically producing large sausage products with substantially flat ends from shirred casings, thereby improving slice yield and avoiding or minimizing the rework associated with the rounded ends of conventional sausages.

This is accomplished by locating flat annular disks and a shirred casing on a tube sized to fit over, or to serve as, a stuffing horn. The article is kept in this condition until it is used. During use, casing deshirrs off of the tube over and about the disks. The disks are adapted to be fed at appropriate intervals off an end of the tube and into the deshirred casing for forming the flat leading and trailing ends of the sausage product.

Often the casing may contain an agent which, if exposed to the discs over time, will have a detrimental effect on the disks. Accordingly, in the present invention an arrangement is made which can prevent such exposure until the article is put into use.

SUMMARY OF THE INVENTION

The present invention may be characterized in one aspect thereof by a casing article for use in making flat ended sausage products comprising:

(a) an elongated tubular member having an internal bore of a size sufficient to permit the tubular member to fit over or to serve as a stuffing horn;

(b) a first component including a plurality of flattening disks diposed on the tubular member towards one end thereof, the disks each having an opening to accommodate the passage of the tubular member;

(c) a second component carried on the tubular member including a shirred casing supply longitudinally spaced from the first component, the shirred casing in use, being adapted to deshirr over and about the disks so that disks become disposed within an unshirred portion of the casing, and the casing containing an agent which, if exposed to the disks over time, will have a detrimental affect on the discs; and (d) means providing a barrier to the agent, the means being removably disposed about at least one of the components and about a portion of the tubular member so as to isolate the shirred casing and the disks one from each other to prevent the exposure of the disks to the agent over the time prior to use of the article.

BRIEF DESCRIPTION OF THE DRAWINGS

FIG. 1 is a sectional view of a package article for use in making flat ended sausage products.

FIG. 2 is a sectional view of a package article of FIG. 1 mounted on a stuffing apparatus with portions of said apparatus omitted which are not essential to an understanding of the invention.

FIG. 3 is a partial profile view of a particularly preferred single-piece support tube configuration useful in the invention as mounted on a stuffing horn apparatus.

FIG. 4 is a partial sectional view of a package article incorporating the single-piece support tube configuration of FIG. 3, and showing a shirred casing and a plurality of flattening disks on the tube;

FIG. 5 is a vertical cross-sectional view of a preferred clover-leaf design sizing means useful in the package article of the invention.

DETAILED DESCRIPTION OF THE INVENTION

Figure 6:
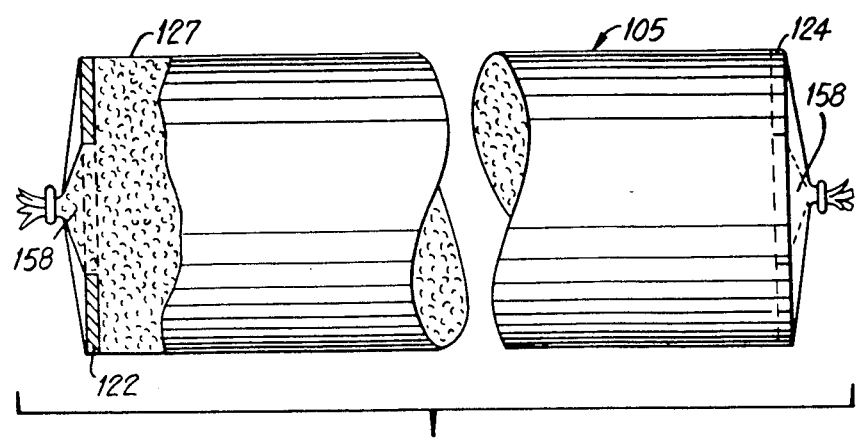
FIG. 6 is a view of a sausage product produced using the package article of the invention.

For a clearer understanding of the subject invention, reference is made to FIG. 1 wherein reference number 25 generally designates one embodiment of a prepackaged shirred tubular casing article as may be used in the manufacture of flat ended sausage products. The prepackaged tubular casing article includes a shirred casing stick 1 having an unshirred portion 2. A sizing means in the form of a sizing disk 3 is implanted in the unshirred portion 2 of said shirred casing stick 1. Said sizing disk and its functions are described in U.S. Pat. Nos. 4,007,761, 4,077,090 and 4,164,057 and U.S. Pat. Nos. Re. 30,265 and Re. 30,390, all incorporated herein by reference. Within the unshirred portion 2 are at least two flattening annular disks, shown in FIG. 1 as disk pair 30a, which includes a trailing annular disk 8 and a leading annular disk 9. The terms "leading" and "trailing" as applied to the disks are defined hereinbelow. As used herein, the term "flattening annular disk" is used to designate any disk which has a central hole and which, when employed as an insert at either end of the stuffed sausage product, will at least partially (and preferably fully) flatten the end of such product, thereby producing a product generally having the shape of a right circular cylinder. A stuffed product having flat ends makes it possible to avoid or minimize rework resulting from the rounded ends associated with conventional sausages.

The flattening annular disks can have any of a wide variety of shapes and sizes including for example, round, elliptical, oval, and polygonal-with-rounded corners, provided that these disks generally conform in outer perimeter to the inner perimeter of the unshirred portion of the casing of the package article. In this regard, it is important that a tight seal exist between the inner casing perimeter and the outer annular disk perimeter so that a seal may be maintained during the stuffing operation and subsequent handling of the food product.

It is preferred that the disks in themselves be supported in some fashion in order to insure their ordered integrity in a disk array 6 in the prepackaged, shirred tubular casing article 25, during shipping and handling, and before and during stuffing operations. Although wide variations in the support mechanism are envisioned, two preferred support mechanisms would include an overwrap 15 (either rigid or flexible) or a central support tube 12, or both. A preferred overwrap is rigid and in the form of a plastic housing or magazine for receiving a stacked array of the disks.

In a preferred embodiment, the central support tube would be one that essentially fills the available cross sectional area provided by the central holes in the annular disks. The support tube, 12, preferably has a circular or ellitpical cross section, more preferably an ellitpical cross section. An elliptical central support tube is particularly preferred when using annular disks with a circular central hole since such a support tube configuration affords a maximum effective cross-section to the support tube for maximum food emulsion throughput while enabling the disks to be angularly disposed on the support tube as further described hereinbelow.

The combination of magazine 15 and support tube 12 together with an array of flattening discs is more particularly described in a copending application Ser. No. 448,349, now U.S. Pat. No. 4,525,895, the disclosure of which is incorporated herein by reference.

The annular disks in the array 6 are detachably-attached in pairs, such as disks pairs 30a, b, c, etc. In turn, at least one disk of the pair is fixedly-attached by flexible means (preferably by means of a flexible tubular membrane 7) to a disk of an adjoining disk pair. Reference is made to copending U.S. application Ser. No. 430,442 now U.S. Pat. No. 4,466,984 which describes in greater detail the disks and the association of one disk to another in order to form the array 6.

The flexible tubular membrane 7 as may be useful for fixed-attachment purposes is preferably a membrane constructed of a plastic film such as, for example, polyethylene film, polyvinyl chloride film or ethylene vinylacetate film. Polyethylene film is preferred. In use this flexible tubular membrane will permit the disk pairs 30b, c, d, etc. to collapse one against the other to form the relatively compact, ordered disk array 6 of disk pairs 30b, c, d, etc. It is preferred that the flexible tubular membrane occupy a minimum of space when fully collapsed in order to minimize the length of this array 6 of disk pairs.

It is preferred that the number of disks in the array be sufficient to provide sausages of a length required in any given commercial situation, taking into account the length of casing available on the shirred stick in the package article and the length of the encased stuffed product required for a particular commercial operation. The required number of disks will be readily apparent to one of ordinary skill in the art, although it is preferred that the number of disks be at least ten. In this regard, either the length of casing in the shirred stick can be varied based on a fixed number of disks or the number of disks can be varied based on a fixed shirred stick length. Typically, a casing having a stuffed diameter of about 4.5 inches and an unshirred casing length of 200 feet might employ 50 of the disk pairs 30a, b, c, etc.

The flattening annular disks useful in the present invention can be made of a wide variety of materials provided that the surface of the material chosen, or coating on the surface of the material, meet the required government specifications for use with food products. Useful materials would include metals such as aluminum and steel, and plastics such as styrene and polyproplene. It is preferred that the disks each be of sufficient strength to resist deformation in the stuffed product. The preferred disks of the present invention are those constructed from 75 lb. tin-plated steel having a thickness of about 0.007 inch and having stiffening annular ribs, such as those often found in can lids, for added support. The tin-plated steel may be appropriately coated with a chromate conversion coating or other coating meeting the required government specifications for use with food products.

The flexible tubular membrane 7 serves as the link between the disk pairs of the disk array 6 and preferably serves as a vehicle to move the disk pairs from an inclined position in the disk array 6 to an upright position as shown for disk pair 30a.

The disk array 6 is preferably disposed in a fashion such that the disks therein are stacked at an acute angle to the longitudinal axis of the casing length 2 in order to allow free movement of the unshirred portion of the casing over the array during the stuffing operation.

In use, the casing article provided as a package article unit to the customer, is loaded on a stuffing apparatus. FIG. 2 shows one embodiment of the package article 25 in place on such a stuffing horn 5 of a stuffing apparatus. The shirred casing stick 1 of the subject invention is placed on the movable support sleeve 24 of said stuffing apparatus, and is attached thereto by means of the sizing disk 3.

A preferred apparatus for using the casing article to make flat ended sausage is described in detail in U.S. Pat. No. 4,551,884, the disclosure of which is incorporated herein by reference. Briefly, the system disclosed in the '884 patent has, axially aligned with the support tube, seal means 8a and positioning means 8b. The seal means is preferably a split seal ring that, in use, provides a tight seal between an unshirred portion of casing length 2 and trailing annular disk 8 of first disk pair 30a during the first stuffing cycle and between subsequent casing lengths and trailing disks for subsequent stuffing cycles. The positioning means 8a preferably consists of a crescent-shaped ring adapted for fore-and-aft motion over disk array 6, and further adapted to move pairs of disks out of the array and into the stuffing position occupied by first disk pair 30a.

During stuffing, as more fully described in the '884 patent, a pressurized food product is discharged from the stuffing horn and between the the disks 8 and 9 comprising disk pair 30a. The lead disk 9 is thereby pushed off the stuffing horn and stuffing continues until a desires stuffed length is formed. Thereafter, the trailing disk 8 is pushed off the stuffing horn and the deshirred casing is gathered behind the trailing disk to provided the flat ended stuffed product.

Shown in FIG. 3 is a single-piece support tube 63 which fits over a stuffing horn assembly including a stuffing horn 65 and stuffing horn extension 67. The single-piece support tube 63 comprises a conical nose piece 69 having a flexible end lip 70, an elliptical support sleeve 71 for carrying an array of the disk pairs, a sizing means 73, and a disk array overwrap tie-down slot 74 all fit together with a CHD tubular core 75 to provide strength and coherency advantages that are associated with single piece construction.

FIG. 4 shows a package article utilizing the above-discussed single-piece support tube on which is mounted a shirred casing stick 77 and an unshirred casing length 79. Disposed within the unshirred casing length is a disk pair array 81 and an array overwrap 82, all mounted thereon.

A mentioned hereinabove, the disk array 81 is preferably canted for use during stuffing as shown in FIG. 4. Since the casing to be stuffed can have an inner diameter approaching the outer diameter of the disk array 81, the canting will allow the casing to be drawn over the disk array and its overwrap 82 during the stuffing operation with minimal drag. This allows the support tube 71 and the stuffing horn extension to be generally elliptical in vertical cross-section (see FIG. 5) because the projection of the round, but canted, central holes of the disk array 81 onto a plane normal to the axis of the stuffing horn will be an ellipse.

FIG. 6 shows a sausage 105 produced using the package article of the present invention. The sausage 105 is encased by casing 127 and is shown with substantially flat ends produced by flattening annular disks 122, 124. The emulsion contained in pockets 158 must be reworked. It should be noted, however, that the rework contained in the pockets is substantially minimal as compared to that found in the rounded ends of the prior art sausages, as discussed in the following example.

Figure 7:
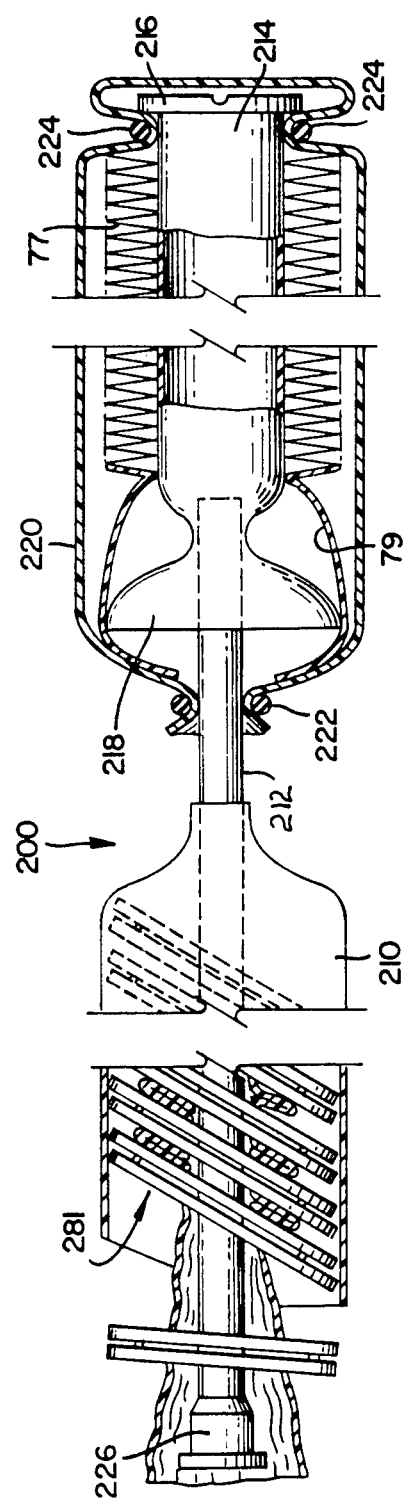
FIG. 7 is a view similar to FIG. 4 only showing another embodiment of the invention.

Another embodiment of the casing article is shown in FIG. 7 and is generally indicated at 200. This embodiment is similar to the single unit construction as shown in FIGS. 3 and 4. However, the disk array 281 is contained in a rigid housing or magazine 210. This magazine and the association of the disk array, the magazine and the central support tube 212 are more particularly described in the aforementioned U.S. Pat. No. 4,525,895, the disclosure of which is incorporated herein by reference. The shirred casing 77 is disposed on a tubular core 214 which is connected to support tube 212 to form a continuous tubular member. With this arrangement, the disk array is supported on a forward portion of the tubular member and the shirred casing is on a rearward portion. A stuffing horn (not shown) can extend through the core and support tube or the core can be connected directly to the stuffing machine outlet by means of a split flange 216 so that the core 214 and support tube 212 can serve as the stuffing horn. An appropriate sizing means 218 is located between the core 214 and magazine 210.

It is known to add various agents to shirred casing to enhance or otherwise provide the casing with certain desirable features and properties. For example shirred cellulosic casing may contain up to about 71% moisture, based on the weight of the dry cellulose in the casing, in order to facilitate deshirring and stuffing. Depending upon its intended use, the casing is treated with liquid smoke, coloring agents, and preservatives, or it contains other constituents such as peeling agents, oxygen barriers and the like. Some of these agents may contain volatile components which can have a detrimental affect if left exposed to the extender disks over time.

For example, even though the preferred extender disks are tin-plated steel, the moisture content of the casing can corrode the thin edges of these disks where the tin plate cannot coat. Other agents such as acetic acid or other volatile components in the liquid smoke may likewise attack the disks over time. Other volatiles from agents on or in the casing may condense and accumulate onto the disks. Where the casing does contain such agents, and the casing is closed over the extender disks as shown in FIGS. 1-4, the extender disks are confined in an environment containing a concentration of the detrimental agent. Accordingly, in these cases, it is necessary to keep the extender disks isolated from the casing during the time prior to use. This time between manufacture and use can vary from a matter of weeks to several months, depending upon shipping distance and the inventory requirements of the user.

As shown in FIG. 7, the location of the sizing means 218 between the extender disk array 281 and the casing 77 separates one from the other. However, a more complete isolation of the casing from the extender disks is accomplished by drawing an unshirred portion 79 of the casing over only the sizing means 218 and not over the extenders as in FIGS. 1-4. The casing is then enveloped in a barrier wrap as indicated at 220.

The barrier wrap is a tubular sleeve or a bag which is put over this shirred casing as shown. The open end of the bag is closed to the support tube 212 at a point between the rearmost disk in the array and the shirred casing, and preferably in front of sizing means 218, by any suitable tie or elastic band 222. The bag also is closed to the core 214 behind the shirred casing by a second tie or elastic band 224. This second tie 224 prevents the volatile agent from passing into core 214 and through support tube 212 to contact the extender disks on the support tube.

While FIG. 7 shows the barrier wrap 220 as being disposed about the shirred casing supply 77, it should be appreciated that the wrap can be placed over the magazine 210. In this case, the ties would be located to close the wrap over the extender disks on the support tube so as to isolate the shirred casing from the disks. This is shown in FIG. 8.

Figure 8:
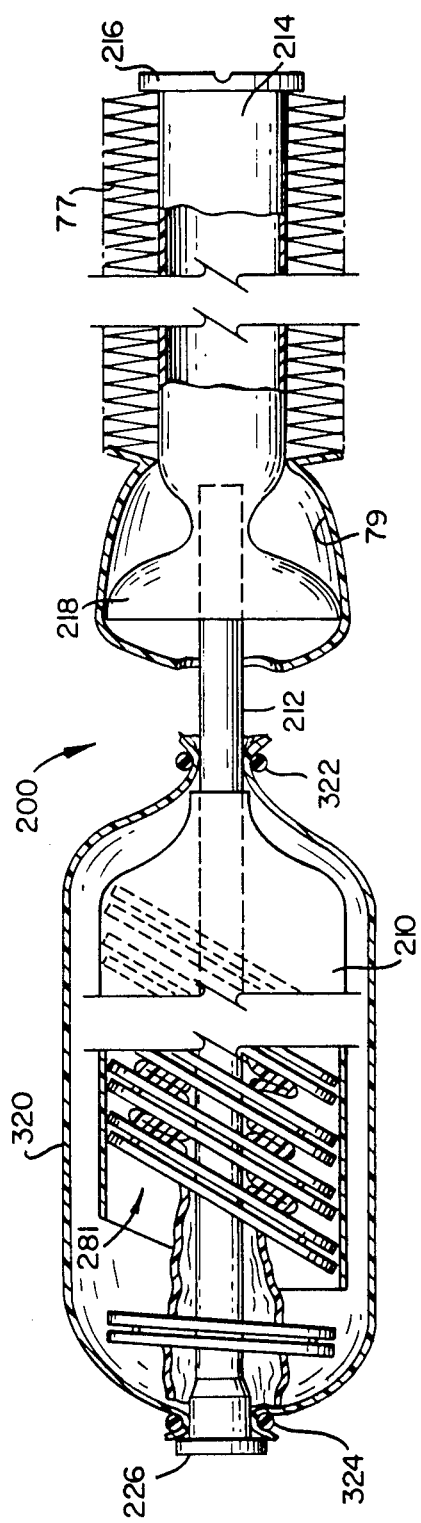
FIG. 8 is a view showing still another embodiment of the invention.

Referring to FIG. 8, the barrier wrap is shown in the form of a tubular sleeve 320. One open end of the sleeve is closed by a tie or elastic band 322 about the support tube 212 at a point between the magazine 210 and sizing means 218. The second open end of the sleeve 320 is closed about the nose piece 226 by a second tie or elastic band 324.

Thus the figures show that the barrier wrap can be disposed and closed over either the casing or over the disks in order to isolate one of these components from the other. Moreover, while FIG. 10 shows the barrier wrap to be in the form of a bag, and FIG. 8 shows it in the form of a tubular sleeve, the bag can be considered to be a tubular sleeve having one closed end. Also, regardless of whether a tubular sleeve or a bag is used, it should be appreciated that the barrier wrap can extend over both the casing component and the disk component. In this case, a tie would be located between the components such as shown at 222 (FIG. 7) or 322 (FIG. 8) and a second tie would be located at one or both ends of the tubular member as shown at 224 (FIG. 7) and/or as shown at 324 (FIG. 8).

The material of the barrier wrap is selected for the property of being impervious to the detrimental volatile agent, be it moisture, acetic acid or whatever. Preferably, the barrier wrap comprises one of the well known barrier films, such as polyvinylidine chloride copolymer or an ethylene-vinyl acetate-vinyl alcohol copolymer. However, any flexible plastic film can be used, provided the film composition and thickness provides a low vapor transmission rate for the volatile agent which must be isolated from the disks. For example, a multilayer film consisting of a polyvinylidine chloride layer sandwiched between layers of ethylene vinyl acetate provides a barrier that is substantially impervious to both moisture vapor and corrosive gases.

The entire casing article 200 is then placed into a shipping container. If desired other overwraps can be used to envelope the entire casing article 200 prior to packaging the article for shipping.

In use, the article of FIG. 7 or FIG. 8 is removed from its shipping carton, the barrier wrap is removed and the casing article is loaded onto the stuffing machine. Prior to stuffing, the casing is pulled over the magazine 210 and the nose piece 226 so that the casing can be clipped closed over the nose piece as shown in FIGS. 1 and 2.

While a barrier wrap is a preferred means of isolating the disk component and the casing component, one from the other, isolation also can be accomplished by locating all of the disks within the magazine and plugging the open end of the magazine. Also, when a bag is used as shown in FIG. 7, the tie 224 can be omitted and instead a plug inserted into either the nose piece 226 or into the core 214 to prevent the through passage of the volatile agent.

Having described the invention in detail, what is claimed as new is:

1. A shirred casing article comprising:
   (a) an elongated tubular member having an internal bore of a size sufficient to permit the tubular member to fit over, or to serve as a stuffing horn and means at an aft end of the tubular member for connecting said tubular member to a stuffing machine;
   (b) a first component carried on said tubular member towards the fore end thereof, said first component comprising an array including a plurality of flattening disks arranged in pairs and disposed on said tubular member, said disks each having an opening to accommodate passage of said tubular member and said disks each being slidable along said tubular member;
   (c) a second component carried on said tubular member towards the aft end thereof, said second component including a cellulosic casing in the form of a shirred stick which shirred stick is separated and longitudinally spaced from said first component, said cellulosic casing, in use, being deshirrable forward from said shirred stick over and about the disks, and said casing containing an agent which has a detrimental effect on the disks when said disks are exposed to said agent over time; and
   (d) means providing a barrier to said agent, said means being removably disposed about at least one of said components and about a portion of said tubular member for isolating said cellulosic casing and said array of said disks from each other, and for preventing the exposure of said disks to said agent over time and prior to use of said article.

2. A shirred casing article as in claim 1 wherein said agent is a volatile constituent of said casing and said means is a material impervious to said volatile constituent.

3. A shirred casing article as in claim 2 wherein said volatile constituent comprises moisture.

4. A shirred casing article as in claim 2 wherein said volatile constituent comprises an acidic vapor.

5. A shirred casing article as in claim 1 wherein said barrier means comprises a barrier film.

6. A shirred casing article as in claim 5 wherein said barrier film is in the form of a tubular sleeve.

7. A shirred casing article as in claim 6 wherein said tubular sleeve is disposed about at least one of said components and has open ends which are closed about said tubular member.

8. A shirred casing article as in claim 7 wherein a portion of said sleeve is closed about said tubular member between said components.

9. A shirred casing article as in claim 7 wherein said tubular sleeve is disposed about said first component.

10. A shirred casing article as in claim 7 wherein said tubular sleeve is disposed about said second component.

11. A shirred casing article as in claim 7 including ties closing the open ends of said tubular sleeve about said tubular member.

12. A shirred casing article as in claim 11 wherein said ties are elastic bands.

13. A shirred casing article as in claim 5 wherein said barrier film is in the form of a bag.

14. A shirred casing article as in claim 13 including a tie closing the open end of said bag about said tubular member at a point intermediate said components.

15. A shirred casing article as in claim 1 wherein said barrier means comprises a multilayer film.

16. A shirred casing article as in claim 15 wherein said multilayer film is substantially moisture and gas impervious and comprises a layer of polyvinylidine chloride sandwiched between layers of ethylene vinyl acetate.

17. A shirred casing article as in claim 1 wherein said barrier means comprises a polyvinylidene chloride film.

* * * * *